US008478679B2

(12) United States Patent
Spirgel

(10) Patent No.: US 8,478,679 B2
(45) Date of Patent: Jul. 2, 2013

(54) SYSTEM AND METHOD FOR MANAGING INITIAL OR VARIATION MARGIN VIA CUSTODY

(75) Inventor: Jonathan S. Spirgel, Great Neck, NY (US)

(73) Assignee: The Bank of New York Mellon, New York, NY (US)

(*) Notice: Subject to any disclaimer, the term of this patent is extended or adjusted under 35 U.S.C. 154(b) by 230 days.

(21) Appl. No.: 12/853,531

(22) Filed: Aug. 10, 2010

(65) Prior Publication Data
US 2011/0055068 A1 Mar. 3, 2011

Related U.S. Application Data

(60) Provisional application No. 61/232,570, filed on Aug. 10, 2009.

(51) Int. Cl.
G06Q 40/00 (2012.01)

(52) U.S. Cl.
USPC .................................. 705/37; 705/35; 705/39

(58) Field of Classification Search
USPC ....................................... 705/15–45
See application file for complete search history.

(56) References Cited

U.S. PATENT DOCUMENTS

2001/0034688 A1* 10/2001 Annunziata ...................... 705/37
2002/0178102 A1* 11/2002 Scheinberg et al. ............. 705/37
2005/0216388 A1* 9/2005 Houghton et al. ............... 705/35
2007/0179874 A1* 8/2007 Spirgel et al. .................... 705/35
2011/0093380 A1* 4/2011 Fitzpatrick et al. .............. 705/37

OTHER PUBLICATIONS

"Collateralization and the ISDA Credit Support Annex", David Suetens, International Financial Law Review, v14n8, pp: 15-16, Aug. 1995, ISSN: 0262-6969. Retrieved from Dialog.*

* cited by examiner

Primary Examiner — Hai Tran
(74) Attorney, Agent, or Firm — Pillsbury Winthrop Shaw Pittman, LLP

(57) ABSTRACT

In various embodiments, a computerized system and method manages custody and mitigates counterparty credit risk exposure associated with a trade of a financial instrument. A custodian computer system is established that receives an initial margin payment from a pledgor and electronically posts the initial margin payment in a custody account record maintained in the database. A control agreement is established between the pledgor and a secured party with agreement details stored in the database. The dual-custody control agreement gives control of the custody account to the pledgor if the secured party defaults on trade obligations, and gives control of the custody account to the secured party if the pledgor defaults on trade obligations. During the life of the trade, the custodian may invest a current margin deposit in the custody account directly through the network into one or more investment vehicles to achieve a greater return.

40 Claims, 5 Drawing Sheets

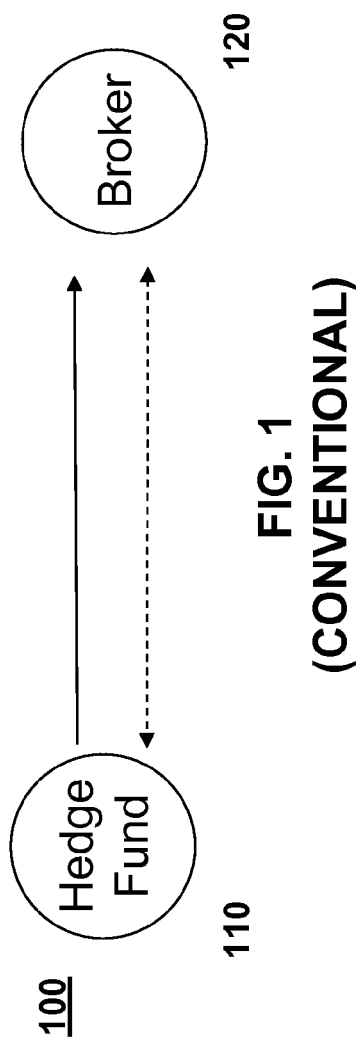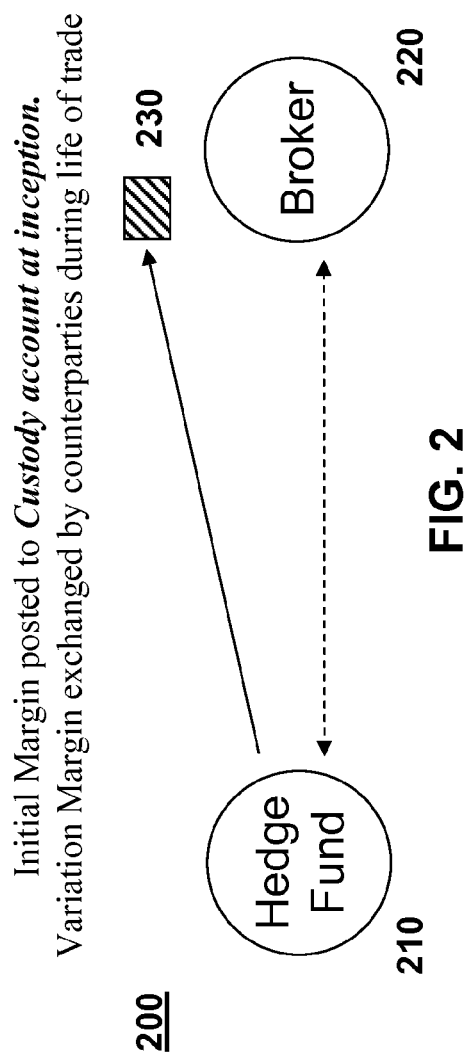

SYSTEM AND METHOD FOR MANAGING INITIAL OR VARIATION MARGIN VIA CUSTODY

CROSS REFERENCE TO RELATED APPLICATIONS

This application claims benefit under 35 USC 119(e) to application Ser. No. 61/232,570 filed on Aug. 10, 2009 the entire contents are incorporated herein by reference.

BACKGROUND

This disclosure relates to a computer-implemented system and method for managing custody of financial instruments, in particular, a computer-implemented system and method for mitigating counterparty credit risk exposure in hedge fund transactions.

Derivatives are financial contracts, or financial instruments, whose values are derived from the value of something else (known as the "underlying"). The underlying value on which a derivative is based can be an asset (e.g., commodities, equities, residential mortgages, commercial real estate, loans, bonds), an index (e.g., interest rates, exchange rates, stock market indices, consumer price index (CPI)), weather conditions, or other items. Credit derivatives are based on loans, bonds or other forms of credit.

The main types of derivatives are forwards, futures, options, and swaps, which can be used to mitigate the risk of economic loss arising from changes in the value of the underlying. This activity is known as hedging. Alternatively, derivatives can be used by investors to increase the profit arising if the value of the underlying moves in the direction they expect. This activity is known as speculation.

Broadly speaking, there are two distinct groups of derivative contracts, which are distinguished by the way they are traded in market. Over-the-Counter (OTC) derivatives are contracts that are traded (and privately negotiated) directly between two parties without going through an exchange or other intermediary. Products such as swaps, forward rate agreements, and exotic options are almost always traded in this way. The OTC derivative market is the largest market for derivatives, and is largely unregulated with respect to disclosure of information between the parties, since the OTC market is made up of banks and other highly sophisticated parties, such as hedge funds. Credit Default Swaps (CDS) are one example of derivatives that are often traded in the OTC derivative market.

Because OTC derivatives may not be traded on an exchange, there may be no central counterparty. Therefore, they are subject to counterparty risk, like an ordinary contract, since each counterparty relies on the other to perform.

A counterparty is a legal and financial term that means a party to a contract. A counterparty is usually the entity with whom one negotiates on a given agreement, and the term can refer to either party or both, depending on context. Any legal entity can be a counterparty. Usually, to say that there are counterparties to an arrangement means that there is some potential for conflict between them. Well-drafted contracts usually attempt to spell out in explicit detail what each counterparty's rights and obligations are in every conceivable circumstance.

Within the financial services sector, the term market "counterparty" may be used to refer to brokers, investment banks, and other securities dealers that serve as the contracting party when completing OTC securities transactions. The term is generally used in this context in relation to "counterparty risk", otherwise known as default risk, which is the risk of monetary loss a firm may be exposed to if the counterparty to an OTC securities trade encounters difficulty meeting its obligations under the terms of the transaction.

Derivatives are complex instruments devised as a form of insurance, to transfer risk among parties based on their willingness to assume additional risk, or to hedge against it. In spite of their risk, the use of derivatives also has its benefits, because derivatives facilitate the buying and selling of risk, and thus have a positive impact on the economic system. Although someone loses money while someone else gains money with a derivative, under normal circumstances, trading in derivatives should not adversely affect the economic system because it is not zero sum in utility.

In currently implemented financial systems, there can be significant counterparty credit risk exposure in transactions dealing with OTC derivatives. For example, a hedge fund may be exposed to significant balance sheet risk due to the OTC derivative trading counterparty's financial situation, e.g., in the event of bankruptcy of the trading counterparty.

In finance, margin is collateral that the holder of a position in securities, options, or futures contracts has to deposit to cover the credit risk of the counterparty (most often the broker). This risk can arise if the holder has done any of the following—borrowed cash from the counterparty to buy securities or options; sold securities or options short; or entered into a futures contract, for example. The collateral can be in the form of cash or securities, and it is generally deposited in a margin account.

In conventional OTC derivative trades, an initial margin payment is posted directly to an OTC derivative trading counterparty at the inception of the sale, such that a hedge fund is exposed to further risk if the OTC derivative trading counterparty, e.g., a dealer, does not return the initial margin upon maturity or termination of the underlying derivative trade. Furthermore, hedge funds are extremely limited on any investment return on posted margin payments which generally may only earn the so-called "Fed Funds Flat Rate", resulting in assets that may not provide earnings at a desirable rate.

The International Swaps and Derivatives Association (ISDA) is a trade organization of participants in the market for OTC derivatives. ISDA has created a standardized contract (the ISDA Master Agreement) that counterparties, e.g., hedge funds and dealers, use to enter into derivatives transactions. A Credit Support Annex, or CSA, is a legal document which regulates credit support (collateral) for derivative transactions, and it is one of the optional parts that make up an ISDA contract. A CSA defines the terms or rules under which collateral is posted or transferred between swap counterparties to mitigate the credit risk arising from "in the money" derivative positions (i.e., "in the money" would result in a profitable outcome for those exercising the derivatives). Such terms include thresholds, minimum transfer amounts, eligible securities and currencies, "haircuts" applicable to eligible securities, and rules for the settlement of disputes arising over valuation of derivative positions. A CSA, for example, may address the conditions under which a portion of the initial margin posted to a counterparty may be partially refunded or increased in response to a change in one or more market or economic risk factors.

Another type of margin payment used in OTC derivative trading is "variation margin". Variation margin or "maintenance margin" is not collateral, but a daily offsetting of profits and losses which is exchanged by counterparties on a daily or intraday basis in order to reduce the exposure created by carrying highly risky positions. By demanding variation margin exchange between counterparties, the counterparties may be able to maintain a suitable level of risk and cushions against significant devaluations in the underlying instrument. FIG. 1 illustrates conventional trading system 100 in which hedge fund 110 posts an initial margin payment to Broker 120 and in which hedge fund 110 and Broker 120 periodically exchange variation margin payments during the life of the trade.

Upon default of the OTC derivative trading counterparty, a hedge fund becomes a general, unsecured creditor, potentially among several general creditors, and may or may not be able to have any of their initial margin payment returned. Although some forms of credit protection insurance are available for protection of the hedge fund, such insurance can be costly and reduce the cost-effectiveness and profitability of the underlying trade.

What is needed is a computer-implemented system and method for mitigating counterparty credit risk exposure which eliminates a hedge fund's balance sheet exposure to an OTC derivative trading counterparty, and which also reduces default risk by providing a new liquidity tool that helps hedge funds manage margin positions and reduce counterparty risk in an uncertain credit environment. What is further needed, for example, is a computer-implemented system and method that allows hedge funds to regain control of initial margin payments in the event of default of the OTC derivative counterparty and to allow posted margins to be maintained by a third party custodian with access to a variety of short-term investment vehicles that are capable of providing a financial return greater than the Fed Funds Flat Rate.

SUMMARY

This disclosure provides various embodiments of a computer-implemented system and method for mitigating counterparty credit risk exposure. In various aspects of this disclosure, a single solution combining custody and money funds management capabilities is provided.

In one embodiment, a computer-implemented method for mitigating counterparty credit risk exposure in a trade of a financial instrument between a pledgor and a secured party includes establishing a custodian computer system comprising a processor, a network connection to the processor, and a memory coupled to the processor and containing a database therein; receiving, over the network connection, an initial margin payment from the pledgor and electronically posting the initial margin payment in a custody account record maintained in the database; establishing a control agreement between the pledgor and the secured party and storing information relating to the control agreement in the database, wherein the control agreement gives control of the custody account to the pledgor if the secured party defaults on obligations related to the trade of the financial instrument, and wherein the control agreement gives control of the custody account to the secured party if the pledgor defaults on obligations related to the trade of the financial instrument; and investing, by the custodian, the initial margin payment directly through the network into one or more investment vehicles during a life of the trade.

In another embodiment, a computer-implemented system for mitigating counterparty credit risk exposure in a trade of a financial instrument between a pledgor and a secured party, includes a computer system operationally controlled by a custodian and comprising a processor, a network connection between the processor and a computer network, a memory coupled to the processor and containing a database therein configured to store information relating to the trade, a margin processing module, and an investment processing module, wherein each of said processor, network connection, memory, margin processing module, and said investment processing module are operatively coupled together; a user interface to the processor through which the pledgor and the secured party access the computer system over the computer network, wherein an initial margin payment from the pledgor is electronically posted through the user interface and the margin processing module to a custody account record associated with the trade and maintained in the database; and an investment interface between the computer system and the network configured to enable the custodian to invest the initial margin payment directly into one or more investment assets during a life of the trade, wherein information relating to a control agreement between the custodian, the pledgor, and the secured party is stored in the database, wherein the control agreement gives financial control of the custody account to the pledgor through the margin processing module if the secured party defaults on obligations related to the trade of the financial instrument, and wherein the control agreement gives financial control of the custody account to the secured party through the margin processing module if the pledgor defaults on obligations related to the trade of the financial instrument.

In another embodiment, an article of manufacture comprises a computer-readable medium therein that contains computer-executable code which, when executed by a computer processor, causes the computer processor to carry out processing related to the mitigation of counterparty credit risk exposure in a trade of a financial instrument between a pledgor and a secured party. The processing carries out the functions of: configuring a memory that is coupled to the computer processor to include a database therein configured to store information related to the trade; communicating over a network so as to receive an initial margin payment from the pledgor and electronically post the initial margin payment in a custody account record maintained in the database; storing information relating to a control agreement between the pledgor and the secured party in the database, wherein a first parameter associated with the control agreement enables control of the custody account to be given to the pledgor if the secured party defaults on obligations related to the trade of the financial instrument, and wherein a second parameter associated with the control agreement gives control of the custody account to the secured party if the pledgor defaults on obligations related to the trade of the financial instrument; enabling investment by the custodian of at least a portion of a current margin amount directly through the network into one or more investment assets during a life of the trade; and providing one or more automated periodic reports via the network that include information relating to one or more of a current yield, asset size, weighted average maturity, and an interest factor for each of the one or more investment assets.

BRIEF DESCRIPTION OF THE DRAWINGS

Embodiments of the disclosure will now be described with reference to the accompanying drawings in which:

FIG. 1 illustrates a conventional OTC derivative trading system;

FIG. 2 depicts a notional representation of the system and method of an embodiment of this disclosure;

DETAILED DESCRIPTION

Figure 3:
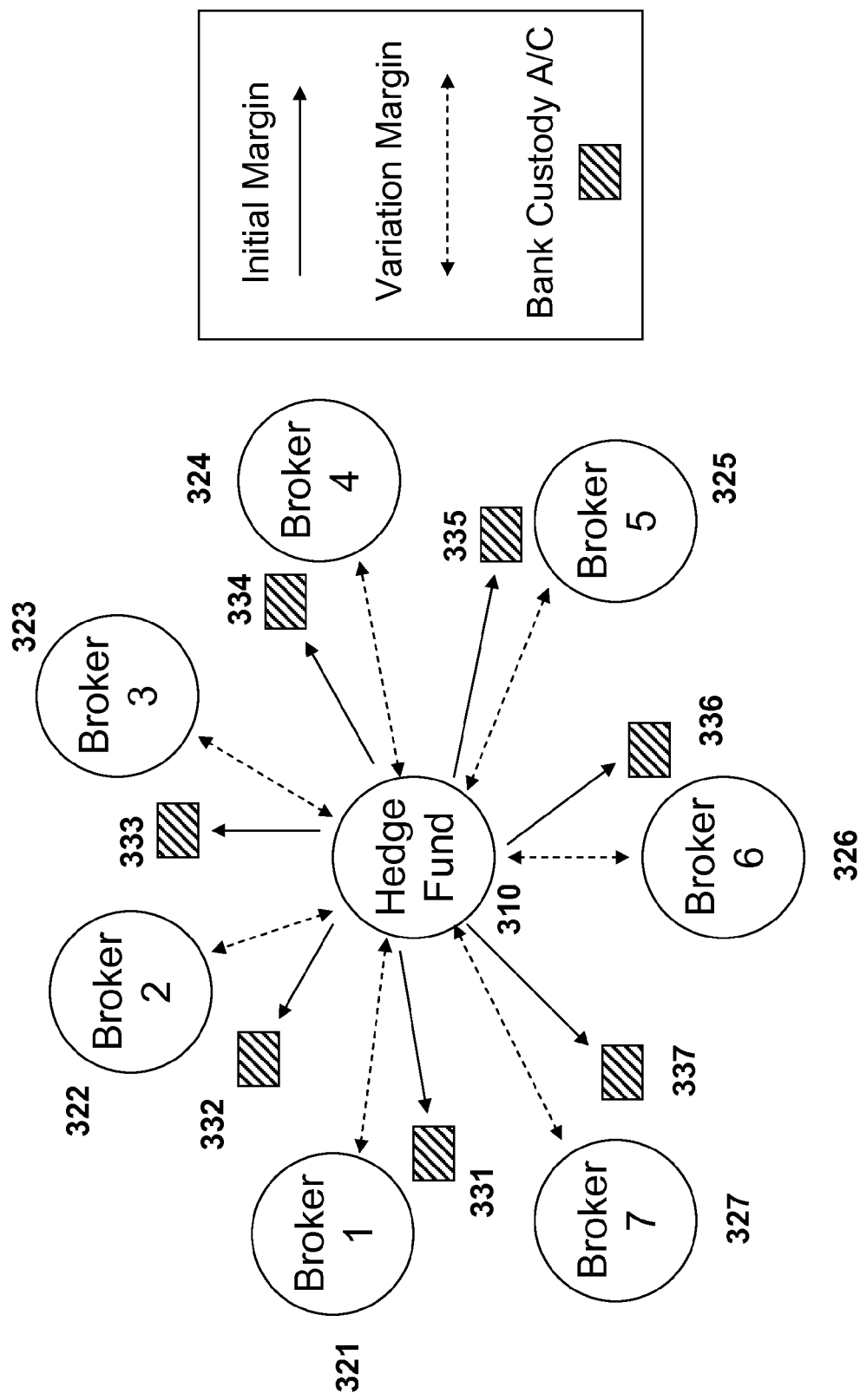
FIG. 3 illustrates a situation where a hedge fund may have multiple existing trade relationships between a number of Brokers in an embodiment of this disclosure.

Various embodiments of this disclosure may be made in hardware, firmware, software, or any suitable combination thereof. Aspects of this disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable storage medium may include read only memory, random access memory, magnetic disk storage media, optical storage media, flash memory devices, and others, implemented in a standalone workstation or in a networked configuration, e.g., networked over a private network or the Internet. Further, firmware, software, routines, or instructions may be described herein in terms of specific exemplary embodiments that may perform certain actions. However, it will be apparent that such descriptions are merely for convenience and that such actions in fact result from computing devices, processors, controllers, or other devices executing the firmware, software, routines, or instructions.

FIG. 2 provides a notional depiction of trade system 200 that enables a trade between hedge fund 210 and broker 220. In contrast to conventional system 100 in FIG. 1, custody account 230 receives the initial margin at inception of the trade.

FIG. 3 illustrates a situation where hedge fund 310 may have multiple existing trade relationships between a number of Brokers 321-327 and associated custody accounts 331-337. The number of brokers and associated custody accounts may be more or less than that depicted, depending on the particular situation. In FIG. 3, the system and method of this disclosure would be particularly useful for hedge fund 310 if all custody accounts 331-337 were held by the same custodian implementing the claimed system and method to track and analyze asset flows for each custody account 331-337. The custodian of custody accounts 331-337 could be a bank, for example.

Figure 4:
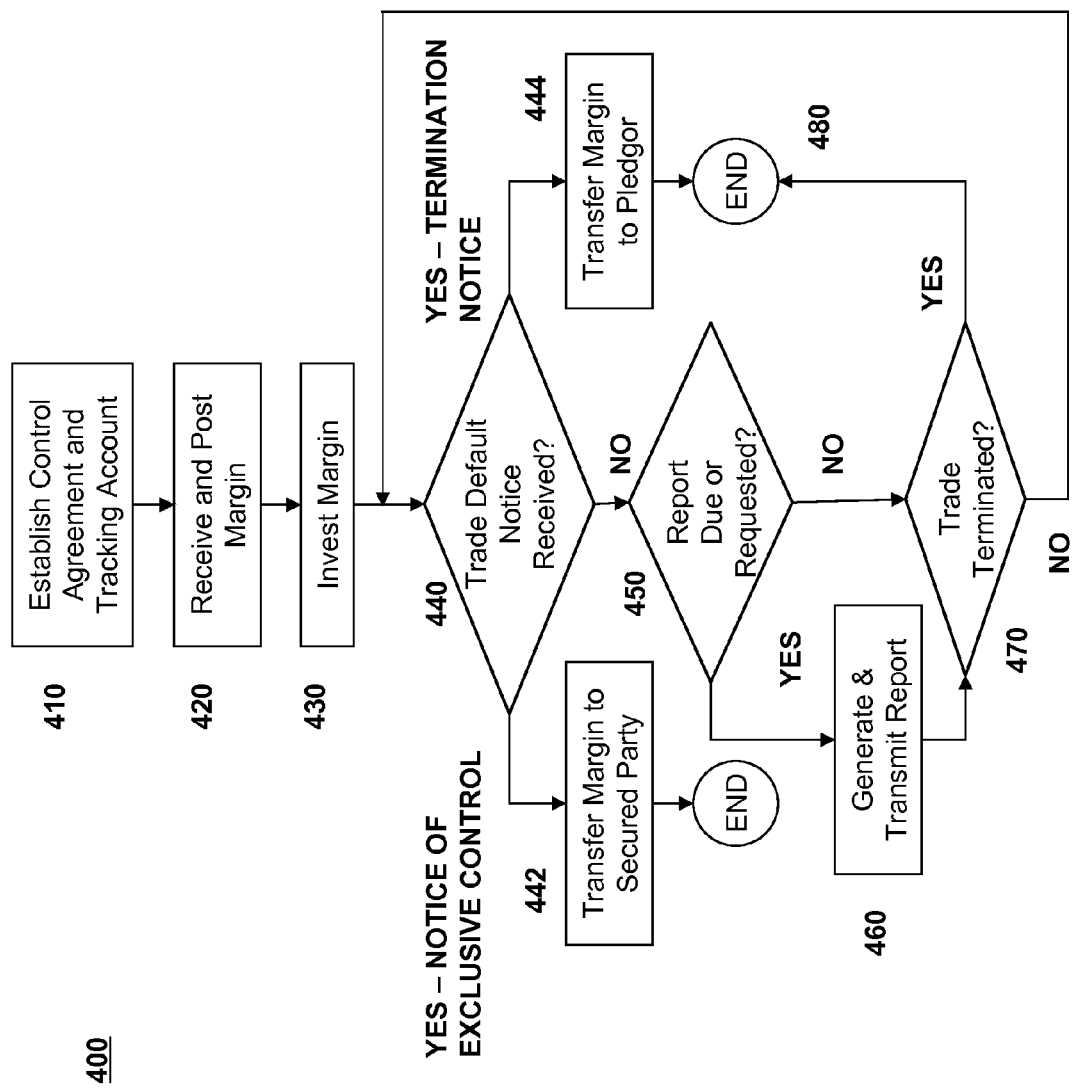
FIG. 4 provides an exemplary flowchart of a method of an embodiment.

FIG. 4 provides an illustrative flowchart of a computer-implemented method for mitigating counterparty credit risk exposure in a trade of a financial instrument between a pledgor and a secured party. In one aspect of this embodiment, the financial instrument may be an over-the-counter (OTC) derivative, the pledgor may be a hedge fund, and the secured party may be a securities dealer. The method is implemented on a custodian computer system that includes a processor, a network connection to the processor, and a memory coupled that contains a database. In one or more embodiments, the network connection may connect the custodian computer system to a private network or to the Internet. When connected to the Internet, the counterparties to the trade (e.g., a pledgor and a secured party) may utilize an Internet web portal that allows secure access to the custodian's computer system through which the pledgor and the secured party may make inquiries related to the underlying trade of the financial instrument.

In step 410, a control agreement between the two counterparties (e.g., a pledgor and a secured party) and the custodian is established, and a tracking account is established in the database. The database may be configured to store information relating to the control agreement in the database, including parameters relating to trade default conditions and obligations. For example, the database may include default conditions and obligations related to the trade of the financial instrument for which breach results in financial control being given to one or another of the counterparties to the trade. In one aspect of an embodiment, the control agreement may be electronically established between the pledgor and the secured party via a network.

In step 420, the custodian receives and posts an initial margin provided by a counterparty (e.g., a hedge fund pledgor) in a custody account. The initial margin may be received in an electronic form over a computer network, for example, and recorded in the database. During the life of the trade, and if there is no default or termination, at step 430 the custodian may invest the margin payment directly through the network into one or more investment vehicles. In one or more aspects of this embodiment, the investment vehicles may include a selection of money market funds and/or individual money market securities accessible electronically over a network.

In the event that a counterparty provides a notice of trade default at step 440, e.g., a "Notice of Exclusive Control" from the secured party or a "Termination Notice" from the pledgor, financial control of any remaining balance of the margin payment in the custody account is transferred to the secured party at step 442 or to the pledgor at step 444, respectively. The termination notice may be provided to the custodian electronically via the network connection, or via a "paper" process that may require the custodian to manually enter the necessary information into the database. In another aspect of this embodiment, and before financial control of the custody account is provided to either the pledgor or secured party, the custodian computer system may be configured to confirm that an indicia of authorization provided in the termination notice corresponds to an approved authorization parameter stored in the database.

In one aspect of this embodiment, at least a portion of the assets in the custody account may be converted into a foreign currency, and at least a portion of the foreign currency may be electronically transferred to either the pledgor or the secured party via the network connection.

If there is no trade default, at step 450 a determination is made as to whether a particular report or reports is due or desired, e.g., on a periodic basis—daily, weekly, etc.—or in response to a specific request by a counterparty or the custodian, for example. If one or more reports are needed, the report is generated and transmitted to the requestor at step 460 or otherwise made available through the web portal. The reports may include information relating to selected or all transactions by a counterparty, financial positions of the counterparty, and accrued income of the counterparty relating to the custody account. The report(s) may be transmitted or made available either on-line through an Internet web portal, or via an e-mail transmission, or both. Further, the reporting may be periodically accomplished at the end of a trading day by an e-mail transmission that includes information relating to one or more of a current yield, asset size, weighted average maturity, and an interest factor for each of the one or more investment vehicles.

In an alternative aspect of this embodiment, the computer system may be interfaced through the network connection with a standardized messaging system for financial messages between member banks. In this aspect, funds related to the custody account may be transferred between banks representing the pledgor and the secured party using the standardized messaging system. The standardized messaging service may be the Society for the Worldwide Interbank Financial Telecommunication system's SWIFT system. Further, reports may be delivered via the SWIFT system.

At step 470, a determination is made as to whether the trade has been terminated or completed. If not, the process returns to step 440 and repeats. If the trade has been terminated or completed, the process ends at step 480.

Figure 5:
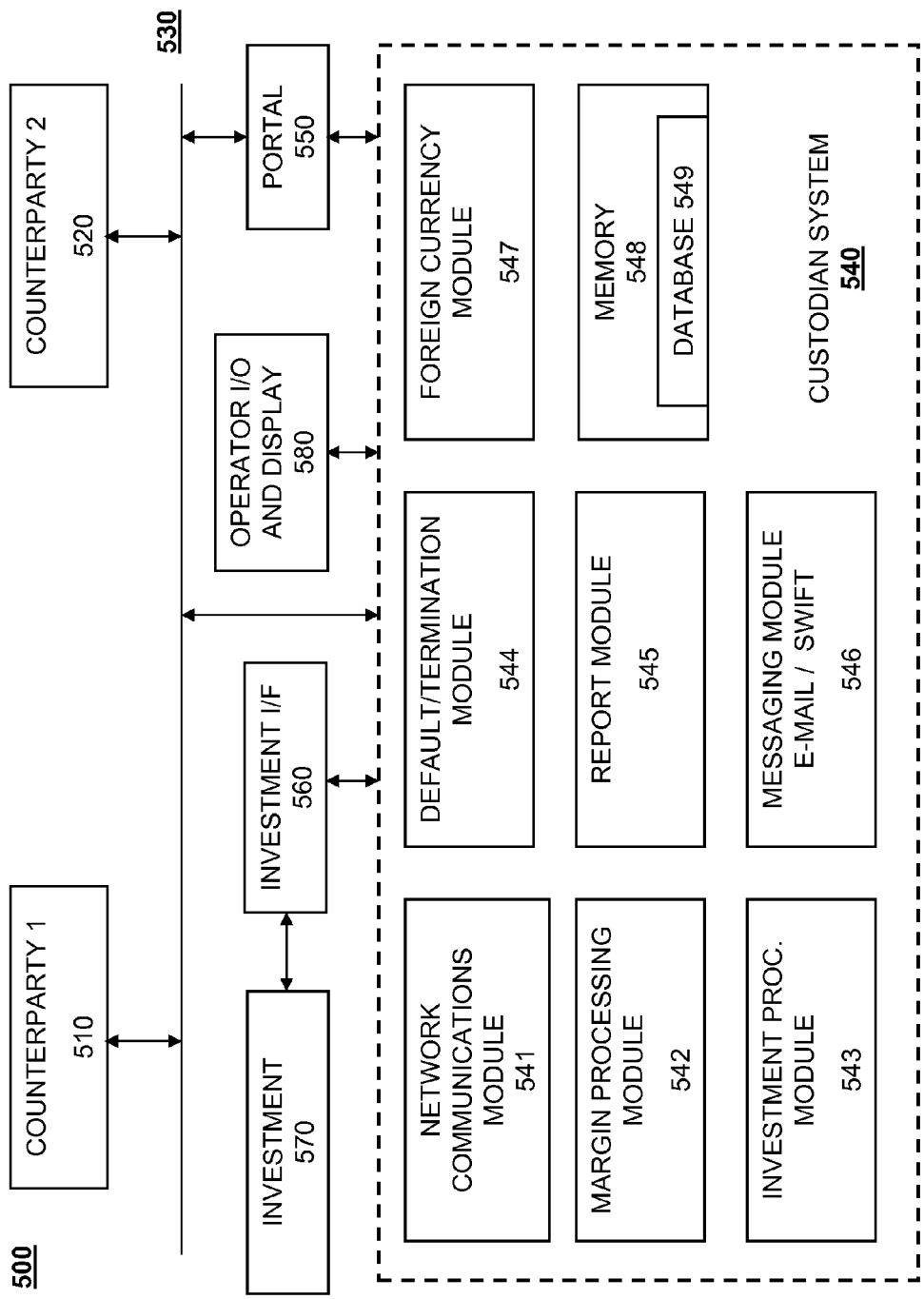
FIG. 5 provides a block diagram of a system of an embodiment.

FIG. 5 provides a functional block diagram of a computer-implemented system for mitigating counterparty credit risk exposure in a trade of a financial instrument between a pledgor and a secured party. In one aspect of this embodiment, the financial instrument is an over-the-counter (OTC) derivative, the pledgor is a hedge fund, and the secured party is a securities dealer. In this embodiment, custodian computer system 540 is operationally controlled by a custodian (not shown), e.g., a bank. Custodian computer system 540 includes one or more processors that execute appropriate software to carry out various functions as indicated. Although these functions are represented in FIG. 5 in the form of various "modules", they are not restricted to such functional delineations, as would be appreciated by a person with skill in the art.

Network communications module is configured to provide a network connection between the processor(s) in custodian computer system 540 and computer network 530, which may be a private network or the Internet, for example. Memory 548 is coupled to a processor or processors, and is configured to contain a database that stores information relating to the trade.

Margin processing module 542 provides functionality to receive and process any initial margin payment or additional margin payments during the life of the trade. Investment processing module 543 is configured to process any "external" investments of all or a portion of the assets related to a margin payment. Such external investments may be made into investment 570 through investment interface 560 using investment processing module 543. The investment assets may include one or more money market funds and/or individual money market securities. In a further aspect of this embodiment, each of these assets is electronically accessible through the network connection and the computer network. In one aspect of this embodiment, margin processing module 542 may be configured to process a change in a required margin account minimum during a life of the trade. In addition, margin processing module 542 may be further configured to electronically transfer a payment representing a portion or all of one or more investment assets in the custody account to one of the pledgor and the secured party in response to the change in the required margin account minimum requirement during the life of the trade.

Memory 548 includes database 549 configured to store information relating to a control agreement between the custodian, the pledgor, and the secured party. The control agreement gives financial control of the custody account to the pledgor through margin processing module 542 if the secured party defaults on obligations related to the trade of the financial instrument. Further, the control agreement gives financial control of the custody account to the secured party through margin processing module 542 if the pledgor defaults on obligations related to the trade of the financial instrument.

Custodian computer system 540 also includes report module 545 that uses a tracking account stored in the database for each counterparty associated with the trade to generate analysis reporting relating to the movement of one or more assets in an associated margin account.

Report module 545 is configured to provide a number of different reports relating to the custody account and one or more of (a) transactions by a counterparty, (b) financial positions of the counterparty, and (c) accrued income of the counterparty, among other information. The different reports may be accessed by a user through on-line access through portal 550, e.g., Internet web portal, or via an e-mail transmission, or both. Further, report module 545 may be configured to provide automated periodic reports by an e-mail transmission that includes information relating to one or more of a current yield, asset size, weighted average maturity, and an interest factor for each of the investment assets.

Custodian computer system 540 may also include messaging module 546 that generates e-mail messages and/or interfaces computer system 540 with a standardized messaging system for financial messages between member banks. Further, funds associated with the custody account may be transferred between banks associated with the pledgor and the secured party using the standardized messaging system. One such standardized messaging service is the Society for the Worldwide Interbank Financial Telecommunication (SWIFT) system. Still further, reports may be delivered via the SWIFT system.

In addition, custodian computer system 540 may also include foreign currency conversion module 547 configured to convert at least a portion of the investment assets in the custody account into a foreign currency. Further, and in conjunction with margin processing module 542, at least a portion of the converted foreign currency may be electronically transferred via the network for the benefit of either the pledgor or the secured party.

Custodian computer system 540 may also include default/termination module 544 configured to provide financial control of the custody account to a non-defaulting counterparty. In response to receiving a notification of a trade default in the form of a termination notice from the pledgor or a notice of exclusive control from the secured party, financial control of the custody account is transferred to the pledgor or secured party, respectively. In one aspect of this embodiment, notification of a trade default may be provided electronically to the custodian via the network connection. Default/termination module 544 may be configured to confirm that an indicia of authorization provided in the notification of the trade default corresponds to an approved authorization parameter stored in the database before financial control of the custody account is transferred, i.e., that a pre-authorized person has signed the notice of exclusive control or termination notice, either by hand or electronically by known techniques.

System 500 further includes user interface or portal 550 to the processor through which counterparties 510 and 520, e.g., the pledgor and the secured party, access custodian computer system 540 over computer network 530. The initial margin payment from the pledgor may be electronically posted through user interface/portal 550 to margin processing module 542 to a custody account record associated with the trade and maintained in database 549. User interface 550 may be provided as Internet web portal configured to allow secure access to the custodians computer system 540 by the pledgor and the secured party and through which the pledgor and the secured party may conduct investment transactions and/or make inquiries related to the trade of the financial instrument.

Investment interface 560 is coupled to custodian computer system 540 and is configured to enable the custodian to invest the initial or continuing margin payment directly into one or more investment assets during the life of the trade.

Although the combination of functional modules in FIG. 5 are configured to perform in a novel way, each of the functional modules illustrated in the custodian computer system 540 of FIG. 5 may be operatively coupled together in a known way.

Figure 6:
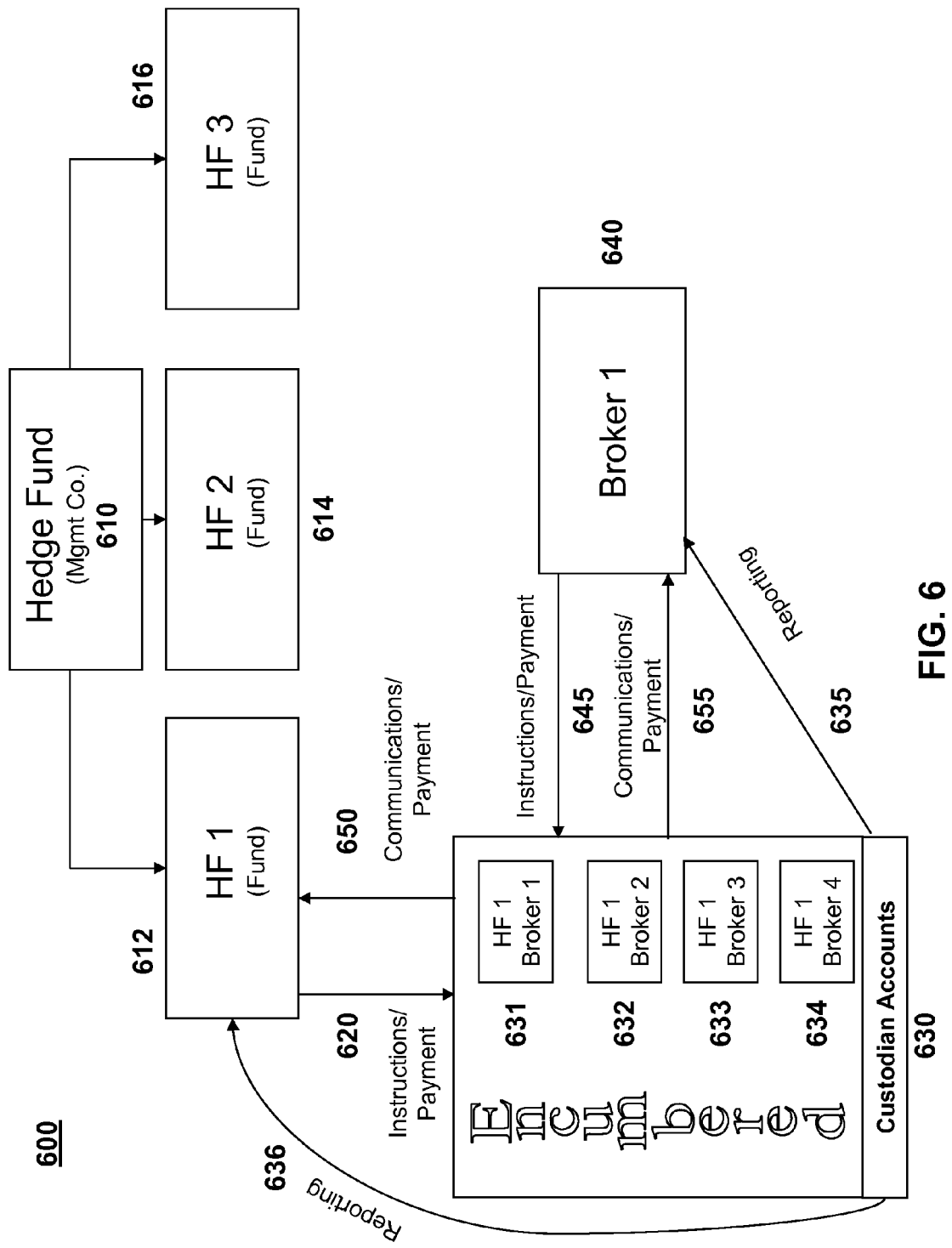
FIG. 6 illustrates process and financial flows for an exemplary system and method for a system and method for managing initial and variation margin via custody.

Turning now to FIG. 6, computer-implemented system 600 for managing initial or variation margin via custody may provide services to one or more hedge fund management companies, e.g., hedge fund management company 610 who may manage one or more hedge funds (HF) 612, 614, and/or 616. Cash may be electronically moved into or out of HF 612 (or other hedge funds) over a network, e.g., an electronic messaging system 620 via an HF-initiated cash movement or Broker-initiated cash movement over electronic messaging system 650 through encumbered custodian account manager 630. Encumbered custodian account manager 630 may contain specific cash amounts in one or more accounts 631-634. Each account 631-634 may be associated with a specific hedge fund and a specific broker, e.g., Broker 1 (ref no. 640). For example, custodian account 631 is associated with HF1 and Broker 1. Other hedge funds 614 and/or 616 and other Brokers (not shown) may be associated together via one or more custodian accounts managed by custodian account manager 630. For example, HF 1 and Broker 2 (not shown) may have custodian account 632 managed and controlled by custodian account manager 630, and similarly for accounts 633 and 634, as illustrated.

Associated money flows into and/or out of custodian account 631 may be reported to Broker 1 via electronic messaging system 635 and to HF 1 via electronic messaging system 636. Examples of messaging include transfers of money, or electronic notifications/communications that a counterparty is in default, e.g., by entering bankruptcy proceedings. Broker 640 may provide notice of the hedge fund's entering bankruptcy proceedings or otherwise defaulting on their agreement to custodian account manager 630 via electronic messaging system 645. Electronic payment by Broker 640 to settle any deficiency in variation margin or any adjustments to initial margin or variation margin amounts may be made on the behalf of itself or HF 612 via the associated custodian account, e.g., custodian account 631, also over electronic messaging system 645. If cash is due to hedge fund 612 from Broker 640, electronic payment may be made on Broker 640's behalf from custodian account 631 to hedge fund 612 via electronic messaging system 650.

The various electronic messaging systems, e.g., 620, 635, 636, 645, 650 and 655, may be implemented via e-mail, for example, or may be implemented by notification via a secure website that the counterparties have access to in connection with their trade and/or custodian accounts. Any termination notices or notice of exclusive control (see FIG. 4) along with any documentary evidence may be sent via one or more of the electronic messaging systems mentioned above in the event of default by a party, i.e., either HF 612 or Broker 640.

Custodian account manager 630 may be configured, for example, to provide a one-day (or longer) waiting period in response to receiving a Notice of Termination or Notice of Exclusive Control from the non-defaulting party via electronic messaging systems 620 or 645, in order to allow the allegedly defaulting party to respond to the allegation of default before margin account balances or control of the underlying security is returned to its original owner. Alternatively, return of any margin amounts due between the counterparties could be executed outside of the control of custodian account manager 630 by pre-agreement of the parties. Further, in one or more embodiments, electronic messaging system 645 may be implemented by, or be part of, for example, the Bank of New York Mellon's MoneyFunds DIRECT$^{SM}$ ("MFD") system, described below.

In another embodiment, an article of manufacture, e.g., a CD, DVD, hard drive, or other storage media may have a computer-readable medium therein that contains computer-executable code. When the computer-executable code is executed by a computer processor, the computer processor carries out processing related to the mitigation of counterparty credit risk exposure in a trade of a financial instrument between a pledgor and a secured party. The executed functions include, in one or more embodiments, configuring a memory that is coupled to the computer processor to include a database therein configured to store information related to the trade and communicating over a network so as to receive an initial margin payment from the pledgor and electronically post the initial margin payment in a custody account record maintained in the database.

Information relating to a control agreement between the pledgor and the secured party may be stored in the database. A first parameter, e.g., a secured party default parameter, associated with the control agreement enables control of the custody account to be given to the pledgor if the secured party defaults on obligations related to the trade of the financial instrument. A second parameter, e.g., a pledgor parameter, associated with the control agreement gives control of the custody account to the secured party if the pledgor defaults on obligations related to the trade of the financial instrument. The executable code may further enable investment to be made by the custodian of at least a portion of a current margin amount directly through the network into one or more investment assets during a life of the trade. In addition, the computer code may be further configured to provide one or more automated periodic reports via the network that include information relating to one or more of a current yield, asset size, weighted average maturity, and an interest factor for each of the investment assets.

An exemplary embodiment of a successful commercial implementation of the system and method of this disclosure may be found the Bank of New York Mellon's ("the Bank") MarginDIRECT$^{SM}$ system that provides safekeeping for posted margin balances away from a hedge fund's OTC derivative trading counterparties so as to reduce the hedge fund's risk exposure. Margin assets received on behalf of clients may be targeted for investment through MoneyFunds DIRECT$^{SM}$ ("MFD"), the Bank's on-line liquidity portal that provides direct access to over 100 money market funds in multiple currencies, as well as individual money market securities, on a single, centralized investment and reporting platform, that greatly assists hedge funds as they strive to manage margin positions.

MarginDIRECT$^{SM}$ service features include the establishment of multiple accounts for each hedge fund counterparty, straight-through-processing for optimum transaction speed, and robust reporting via both traditional periodic reports and on-line updates for the hedge fund and its counterparties. In addition, and to maximize liquidity, MarginDIRECT$^{SM}$ offers real-time reporting on all margin activity by ensuring that both parties can monitor that they are fully collateralized. Such reporting can significantly reduce hedge fund risk exposure. MarginDIRECT$^{SM}$ can serve as a single and complete solution for managing margin positions, account data and money market investments.

Improved liquidity of margin assets received on behalf of clients may be targeted for investment through LiquidityDIRECT$^{SM}$, the Bank's on-line cash management portal that provides direct access to a wide range of money market funds as well as individual money market securities through affiliated registered broker-dealers. Access to all money market funds and securities may be provided on a single, centralized investment platform.

Individual tracking accounts are established for each of the Bank's client's counterparties. These tracking accounts track and report on the movement of assets throughout the margin process.

In addition, MarginDIRECT$^{SM}$ provides robust reporting on all transactions, positions and accrued income. Reports can be accessed on-line at anytime, or emailed to clients directly. Reports can also be delivered via SWIFT.

For optimum transaction speed, MarginDIRECT$^{SM}$ offers straight through processing (STP)—from trade initiation to trade settlement. In addition to US dollar-based investments, MarginDIRECT$^{SM}$ also offers multi-currency options including, for example, British Pound Sterling, Euro, Australian dollar, Canadian dollar, and offshore U.S. dollar options.

Purchases and redemptions placed before the fund's cutoff time may be settled on the same day. To provide maximum flexibility, MarginDIRECT$^{SM}$ offers late day trading windows as late as 5:00 pm EST, for example, although with a fully automated and integrated system, it is possible to offer extended trading windows.

Clients receive daily updates online that include e-mails regarding current yield, asset size, weighted average maturity and the interest factor for each of the funds and securities offered through Liquidity DIRECT$^{SM}$.

Designed to enhance investment transparency for institutional investors, Liquidity DIRECT's innovative reporting capabilities make it particularly attractive from an overall solution standpoint. Transactions conducted through the Liquidity DIRECT's investment portal are posted in real time; multiple holdings are included in a single report; and data is archived for extended periods—all features that enable institutional investors to monitor and reconcile their accounts with convenience. The Liquidity DIRECT$^{SM}$ investment portal also allows for straight-through-processing (STP), which provides clients with quick access to their cash, and customized account monitoring, which enables clients to limit risk exposure and minimize fund-specific credit concerns.

Various embodiments herein are described as including a particular feature, structure, or characteristic, but every aspect or embodiment may not necessarily include the particular feature, structure, or characteristic. Further, when a particular feature, structure, or characteristic is described in connection with an embodiment, it will be understood that such feature, structure, or characteristic may be included in connection with other embodiments, whether or not explicitly described. Thus, various changes and modifications may be made to this disclosure without departing from the scope or spirit of the inventive concept described herein. As such, the specification and drawings should be regarded as examples only, and the scope of the inventive concept to be determined solely by the appended claims.

What is claimed is:

1. A computer-implemented method for mitigating counterparty credit risk exposure in a trade of a financial instrument between a pledgor and a secured party, the method comprising:

establishing a custodian's computer system comprising a processor, a network connection to the processor, and a memory coupled to the processor and containing a database therein;

receiving, over the network connection, an initial margin payment from the pledgor and electronically posting the initial margin payment in a custody account record maintained in the database;

establishing a control agreement between the pledgor and the secured party and storing information relating to the control agreement in the database, wherein the control agreement gives control of the custody account to the pledgor if the secured party defaults on obligations related to the trade of the financial instrument, and wherein the control agreement gives control of the custody account to the secured party if the pledgor defaults on obligations related to the trade of the financial instrument; and investing, by the custodian's computer system, the initial margin payment directly through the network connection into one or more investment vehicles during a life of the trade.

2. The method of claim 1, wherein the financial instrument is an over-the-counter (OTC) derivative, the pledgor is a hedge fund, and the secured party is a securities dealer.

3. The method of claim 1, wherein the network connection connects the computer system to the Internet.

4. The method of claim 1, wherein the one or more investment vehicles comprises one or more money market funds or individual money market securities each accessible electronically through the network connection.

5. The method of claim 1, further comprising providing an Internet web portal that allows secure access to the custodian's computer system by the pledgor and the secured party and, through which, the pledgor and the secured party may conduct investment transactions or making inquiries related to the trade of the financial instrument.

6. The method of claim 1, further comprising establishing, in the database, a tracking account for each counterparty associated with the trade, wherein the tracking account enables analysis reporting relating to the movement of assets in an associated margin account to be accomplished.

7. The method of claim 6, wherein said reporting comprises providing a report on one or more of all transactions by a counterparty, financial positions of the counterparty, and accrued income of the counterparty relating to the custody account.

8. The method of claim 6, wherein said reporting is accomplished either on-line through an Internet web portal or via an e-mail transmission, or both.

9. The method of claim 6, wherein said reporting is periodically accomplished at the end of a trading day by an e-mail transmission that includes information relating to one or more of a current yield, asset size, weighted average maturity, and an interest factor for each of the one or more investment vehicles.

10. The method of claim 1, further comprising interfacing the computer system through the network connection with a standardized messaging system for financial messages between member banks, wherein funds related to the custody account are transferred between one or more of the pledgor and the secured party using the standardized messaging system.

11. The method of claim 10, wherein the standardized messaging service is the Society for the Worldwide Interbank Financial Telecommunication (SWIFT) system.

12. The method of claim 11, wherein said reporting is delivered via the SWIFT system.

13. The method of claim 1, further comprising converting at least a portion of assets in the custody account into a foreign currency, and electronically transferring at least a portion of the foreign currency to one of the pledgor and the secured party via the network connection.

14. The method of claim 1, further comprising, in response to the secured party defaulting on said obligations related to the trade of the financial instrument and the pledgor providing a termination notice to the custodian, providing financial control of the custody account to the pledgor.

15. The method of claim 14, wherein said providing said termination notice comprises providing the termination notice to the custodian electronically via the network connection.

16. The method of claim 14, further comprising, before providing financial control of the custody account to the pledgor, confirming that an indicia of authorization provided in the termination notice corresponds to an approved authorization parameter stored in the database.

17. The method of claim 14, further comprising, before said providing financial control of the custody account to the pledgor, providing the secured party at least one business day to respond to or contest the termination notice.

18. The method of claim 1, further comprising, in response to the pledgor defaulting on said obligations related to the trade of the financial instrument and the secured party providing a notice of exclusive control to the custodian, providing financial control of the custody account to the secured party.

19. The method of claim 18, wherein said providing said notice of exclusive control comprises providing the notice of exclusive control to the custodian electronically via the network connection.

20. The method of claim 18, further comprising, before providing financial control of the custody account to the secured party, confirming that an indicia of authorization provided in the notice of exclusive control corresponds to an approved authorization parameter stored in the database.

21. The method of claim 18, further comprising, before said providing financial control of the custody account to the secured party, providing the pledgor at least one business day to respond to or contest the notice of exclusive control.

22. The method of claim 1, wherein said establishing a control agreement comprises electronically establishing the control agreement between the pledgor and the secured party via a network coupled to the network connection.

23. A computer-implemented system for mitigating counterparty credit risk exposure in a trade of a financial instrument between a pledgor and a secured party, the system comprising:
a computer system operationally controlled by a custodian and comprising:
a processor,
a network connection between the processor and a computer network,
a memory coupled to the processor and containing a database therein configured to store information relating to the trade,
a margin processing module, and
an investment processing module,
wherein each of said processor, network connection, memory, margin processing module, and said investment processing module are operatively coupled together;
a user interface to the processor through which the pledgor and the secured party access the computer system over the computer network, wherein an initial margin payment from the pledgor is electronically posted through the user interface and the margin processing module to a custody account record associated with the trade and maintained in the database; and
an investment interface coupled to the computer system and configured to enable the custodian to invest the initial margin payment directly into one or more investment assets during a life of the trade,
wherein information relating to a control agreement between the custodian, the pledgor, and the secured party is stored in the database, wherein the control agreement gives financial control of the custody account to the pledgor through the margin processing module if the secured party defaults on obligations related to the trade of the financial instrument, and wherein the control agreement gives financial control of the custody account to the secured party through the margin processing module if the pledgor defaults on obligations related to the trade of the financial instrument.

24. The computer-implemented system of claim 23, wherein the financial instrument is an over-the-counter (OTC) derivative, the pledgor is a hedge fund, and the secured party is a securities dealer.

25. The computer-implemented system of claim 23, wherein the computer network comprises the Internet.

26. The computer-implemented system of claim 23, wherein the one or more investment assets comprises one or more money market funds or individual money market securities each accessible electronically through the network connection and the computer network.

27. The computer-implemented system of claim 23, wherein the user interface comprises an Internet web portal configured to allow secure access to the custodian's computer system by the pledgor and the secured party and through which the pledgor and the secured party may conduct investment transactions or make inquiries related to the trade of the financial instrument.

28. The computer-implemented system of claim 23, wherein the computer system further comprises a report module therein, wherein the database is configured to store a tracking account for each counterparty associated with the trade, wherein the tracking account is used by the report module to generate analysis reporting relating to the movement of one or more assets in an associated margin account.

29. The computer-implemented system of claim 28, wherein said report module is configured to provide a plurality of different reports relating to the custody account and one or more of: (a) transactions by a counterparty, (b) financial positions of the counterparty, and (c) accrued income of the counterparty.

30. The computer-implemented system of claim 29, wherein one or more of said plurality of different reports are accessible by a user either through on-line access through an Internet web portal, via an e-mail transmission, or both.

31. The computer-implemented system of claim 30, wherein said report module is configured to provide automated periodic reports by an e-mail transmission that includes information relating to one or more of a current yield, asset size, weighted average maturity, and an interest factor for each of the one or more investment assets.

32. The computer-implemented system of claim 23, wherein the computer system further comprises a messaging module that interfaces the computer system with a standardized messaging system for financial messages between member banks, wherein funds associated with the custody account may be transferred between banks associated with one or more of the pledgor and the secured party using the standardized messaging system.

33. The computer-implemented system of claim 32, wherein the standardized messaging service is the Society for the Worldwide Interbank Financial Telecommunication (SWIFT) system.

34. The computer-implemented system of claim 29, wherein one or more of said plurality of different reports is delivered via the Society for the Worldwide Interbank Financial Telecommunication (SWIFT) system.

35. The computer-implemented system of claim 23, wherein the computer system further comprises a foreign currency conversion module configured to:
- convert at least a portion of said one or more investment assets in the custody account into a foreign currency, and
- electronically transfer at least a portion of the converted foreign currency via the network for the benefit of one of the pledgor and the secured party.

36. The computer-implemented system of claim 23, wherein the computer system further comprises a default/termination module configured to provide financial control of the custody account to a non-defaulting one of the pledgor and the secured party,
- wherein, in response to receiving a notification of a trade default in the form of a termination notice from the pledgor, financial control of the custody account is transferred to the pledgor,
- wherein, in response to receiving a notification of a trade default in the form of a notice of exclusive control from the secured party, financial control of the custody account is transferred to the secured party.

37. The computer-implemented system of claim 36, wherein said notification of a trade default is provided electronically to the custodian via the network connection.

38. The computer-implemented system of claim 36, wherein the default/termination module is configured to confirm that an indicia of authorization provided in the notification of the trade default corresponds to an approved authorization parameter stored in the database before financial control of the custody account is transferred.

39. The computer-implemented system of claim 23, wherein the margin processing module is configured to process a change in a required margin account minimum during a life of the trade, wherein the margin processing module is further configured to electronically transfer a payment representing a portion of said one or more investment assets to one of the pledgor and the secured party in response to the change in the required margin account minimum.

40. An article of manufacture comprising a non-transitory computer-readable medium therein that contains computer-executable code which, when executed by a computer processor, causes the computer processor to carry out processing related to the mitigation of counterparty credit risk exposure in a trade of a financial instrument between a pledgor and a secured party, wherein said processing carries out the functions of:
- configuring a memory that is coupled to the computer processor to include a database therein configured to store information related to the trade;
- communicating over a network so as to receive an initial margin payment from the pledgor and electronically post the initial margin payment in a custody account record maintained in the database;
- storing information relating to a control agreement between the pledgor and the secured party in the database, wherein a first parameter associated with the control agreement enables control of the custody account to be given to the pledgor if the secured party defaults on obligations related to the trade of the financial instrument, and wherein a second parameter associated with the control agreement gives control of the custody account to the secured party if the pledgor defaults on obligations related to the trade of the financial instrument;
- enabling investment by the custodian of at least a portion of a current margin amount directly through the network into one or more investment assets during a life of the trade; and
- providing one or more automated periodic reports via the network that include information comprising one or more of a current yield, asset size, weighted average maturity, and an interest factor for each of the one or more investment assets.

* * * * *